INVENTORS
Wilfried Fischer
Werner Baukal

Patented Jan. 12, 1971

3,554,808
HIGH-TEMPERATURE FUEL-CELL BATTERY
Wilfried Fischer and Werner Baukal, Neuenhof, Switzerland, assignors to Aktiengesellschaft Brown, Boveri & Cie, Baden, Switzerland, a joint-stock company
Filed Sept. 6, 1967, Ser. No. 665,882
Claims priority, application Switzerland, Sept. 20, 1966, 13,546/66
Int. Cl. H01m 27/16
U.S. Cl. 136—86                    5 Claims

ABSTRACT OF THE DISCLOSURE

A high-temperature fuel-cell battery consists of a column of fuel cells connected electrically in series, and each cell is composed of a plurality of superimposed layers consisting of a porous electron-conducting layer through which fuel gas is fed transversely, a gas-tight oxygen-ion-conducting layer of cubically stabilized zirconium oxide such as $ZrO_2$ with an additive of $Y_2O_3$ forming the electrolyte, and a porous electron-conducting layer such as $Mn_2O_3$ through which an oxidant gas is passed transversely. A gas-tight electron-conducting layer separates each cell from an adjacent cell in the column, a similar gas-tight electron-conducting layer is provided at the upper and lower ends of the column and all of the layers of the fuel cells and the separation layers between adjacent cells are sintered together to establish a compact columnar structure.

---

This invention relates to a high-temperature fuel-cell battery with a solid electrolyte of cubically stabilized zirconium oxide.

It is known that certain mixed oxides, such as $ZrO_2$—$MgO$, $ZrO_2$—$CaO$, $ZrO_2$—$Y_2O_3$, exhibit very good electrical conductivity by virtue of their special lattice structure. Once it had been possible to prove that electric current is carried by oxygen ions, especially in the case of the $ZrO_2$—$Y_2O_3$ system, various fuel cells using such oxygen-ion-conducting systems as the solid electrolyte were proposed. A solid electrolyte has the advantage among other things, as compared to liquid electrolytes, of itself separating the gaseous reactants. In addition, solid-electrolyte fuel cells are very well suited for operation with CO as the fuel, as well as for $H_2$. These fuels, which are usually not directly available, may be produced from hydrocarbons by corresponding conversion with water-vapor at about 900° C. This temperature corresponds approximately to the operating temperature of the fuel cell which is necessary for the solid electrolyte to reach a sufficiently low specific resistance. As a result, it becomes possible to combine a converter for transforming hydrocarbons into $H_2$ and CO with a fuel-cell battery in one unit, the energy required for conversion purposes being supplied from the waste heat of the fuel-cell battery. Furthermore, no problem is involved in the case of these fuel cells in dissipating the water produced as a combustion product, since it can be taken off in vapor form with the unconsumed residual gases.

However, there are considerable difficulties in the way of embodying solid-electrolyte fuel-cell batteries. These arise above all from the high operating temperature, at which all these metals which might be used for the electrodes or for links for connecting the cells electrically in series are subject to scaling which cannot be tolerated. Furthermore, surface support is made necessary by the fact that the disc-shaped electrolyte members used are necessarily thin and brittle. Finally, it has become evident that the usual metallic electrode coatings on the fuel side are often detached after a relatively long period of operation by the water produced as a reaction product.

The principal object of the invention is to provide a high-temperature fuel-cell battery which does not exhibit the said disadvantages, and which has a particularly simple and compact structure.

The high-temperature fuel-cell battery according to the invention is characterized by a layer-type structure of metallic oxides, wherein a gas-tight electron-conducting covering layer is followed in cyclically repeating sequence by a porous electron-conducting layer for fuel gas-feed purposes, a gas-tight oxygen-ion-conducting layer of cubically stabilized zirconium oxide forming the electrolyte, a porous electron-conducting layer for oxidant-feed purposes, and a gas-tight electron-conducting layer for cell-separation purposes, together forming a compact solid member of substantially cylindrical shape from the end surfaces of which the voltage generated is tapped off, each porous layer being connected to a gas-feed pipe and a gas-exhaust pipe.

One suitable embodiment of the invention will now be described in detail and is illustrated in the accompanying drawings wherein.

Figure 1:
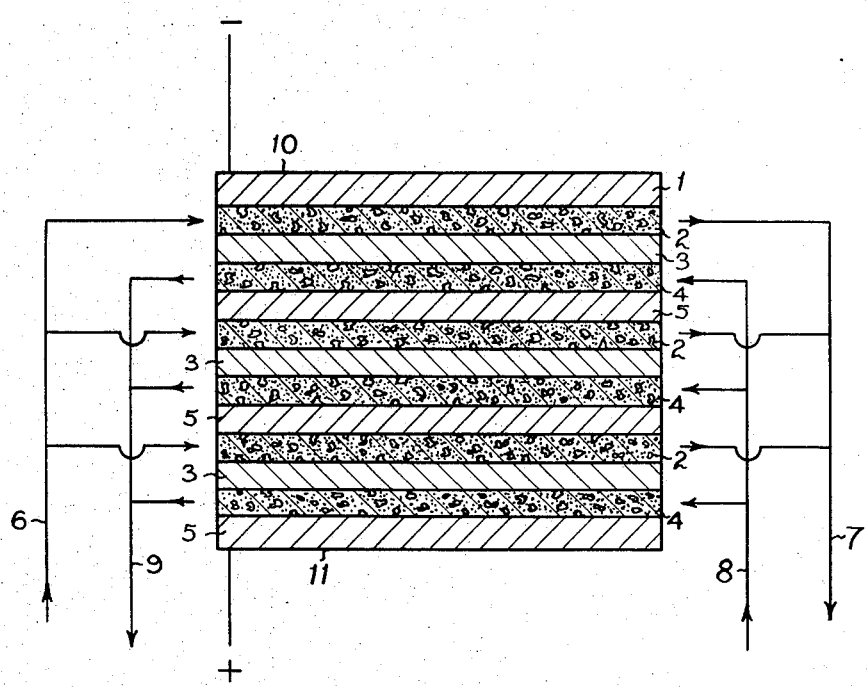
FIG. 1 is a somewhat diagrammatic view showing the basic principles of the novel multi-layer fuel-cell structure.

With reference now to the drawings and to FIG. 1 in particular which shows the principle of construction of the layer-type structure according to the invention, a gas-tight electron-conducting covering layer 1 is followed in cyclically repeating sequence by: a porous electron-conducting layer 2 for fuel gas-feed purposes, a gas-tight oxygen-ion-conducting layer 3 of cubically stabilized zirconium oxide forming the electrolyte, a porous electron-conducting layer 4 for oxidant-feed purposes, and a gas-tight electron-conducting layer 5 for cell-separation purposes. Common fuel gas-feed pipes for supplying the porous layers 2 with combustion gas and a common pipe for exhausting the combustion products and the unconsumed combustion gas are indicated by the lines 6 and 7 respectively. Common feed pipes for supplying the porous layers 4 with oxidant and exhausting the excess oxidant are connected up in accordance with the lines 8 and 9 respectively. The layer-type structure sketched in FIG. 1 comprises three such fuel cells connected in series, the total voltage generated being tapped off from the opposite end faces 10, 11 of the structure. A principal advantage of the layer-type structure resides in its simple construction. The layers all consist of metallic oxides whereof the phases remain stable within the temperature range encountered, and which are joined by sintering processes or solid-substance reactions to form a compact columnar structure. Since in most cases the coefficients of expansion of the individual layers do not differ greatly from one another, no substantial thermal stresses occur. The porous layers 2, 4 not only form surface supports for the solid-electrolyte layers 3, but they also form gas-feed spaces without need for any special sealing means, and furthermore, by virtue of their electro-conductivity, they ensure that the converted electrical charges are conducted out and in. Since the pore-sizes of these layers are by no means critical, they are relatively simple to produce.

An electron-conducting mixed oxide or oxide mixtures may be used as the material for these porous layers 2, 4. Such oxide systems consist, for example, of $ZrO_2$, $Y_2O_3$ and $Mn_2O_3$. The gas-tight electron-conducting layers 5 which separate adjacent cells in the column and similar layers 10, 11 provided at the opposite ends of the column can also be constituted by a mixed oxide or oxide mixture consisting of $ZrO_2$, $Y_2O_3$ and $Mn_2O_3$.

According to another variant, these layers 2, 4 consist of the same or a similar oxygen-ion-conducting material as the solid electrolyte, more particularly $ZrO_2$ with an additive of $Y_2O_3$. The pore-surfaces must then be impregnated with an electron-conducting substance, which advantageously serves at the same time as a catalyst for the electrochemical conversion. This variant has the advantage that the material of the porous layers acts as a continuation of the electrolyte, and thus the phase-boundary reactions take place over a relatively wide region in the porous layers themselves.

The invention will be explained by way of example with reference to specific structures shown in FIGS. 2 to 4.

Figure 2:
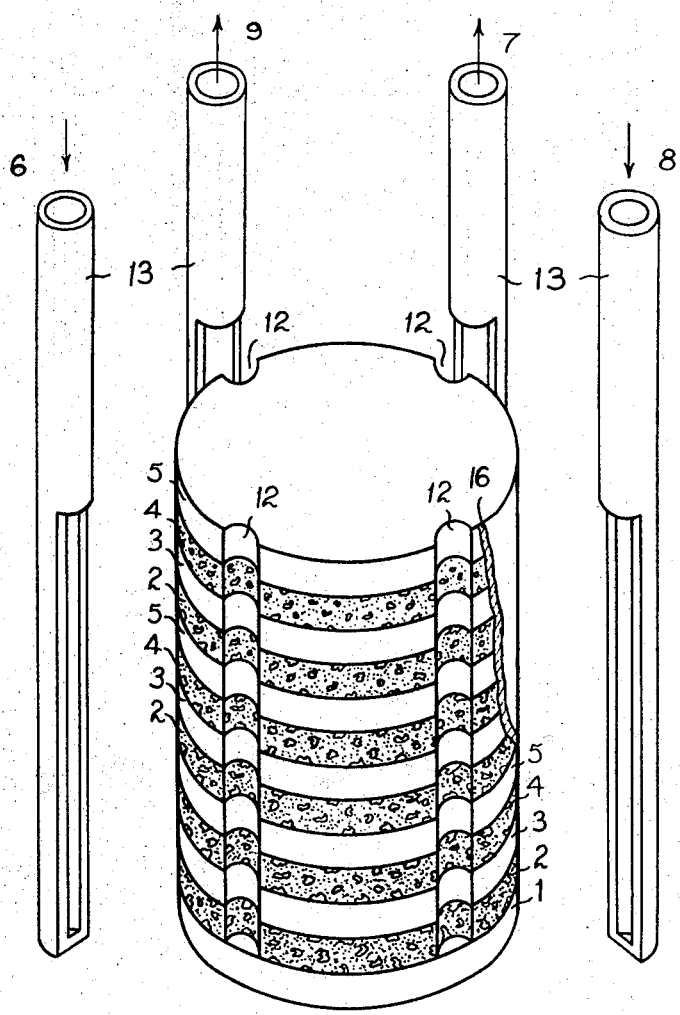
FIG. 2 is an exploded view of one specific embodiment of the improved multi-layer fuel cell.

In order to produce the fuel-cell structure according to FIG. 2, a layer of an aqueous agglutinate of 30% by volume of nickel-oxide powder (grain fraction smaller than $5\mu$) and 70% by volume of $(ZrO_2)_{0.9}(Y_2O_3)_{0.1}$ powder (grain fraction smaller than $50\mu$) is introduced in each case between an electrolyte disc 3 of $$(ZrO_2)_{0.9}(Y_2O_3)_{0.1}$$

about 0.5 mm. thick and an electron-conducting disc 1 or 5 of the same thickness of $(ZrO_2)_{0.7}(Mn_2O_3)_{0.3}$ in order to form the combustion-gas-feed layers 2, and combined into a unit by sintering at 1,700° C. In order to form the layers 4 for oxidant-feed purposes, an aqueous agglutinate of manganese-oxide powder (grain size about $10\mu$) is produced, which layers are now combined with the said units and an electron-conducting covering layer in corresponding sequence to form a column in order to make up the overall structure, and are finally joined by solid-substance reaction at 1,400° C. to form a compact cylindrical member. Four grooves 12 are thereupon ground into the surface of the cylinder thus produced parallel to the axis thereof. In order to seal off the porous layers 2 and 4 laterally, the surface of the cylinder is provided with a gas-tight glass coating 16 partly illustrated, in the figure. The ceramic tubes 13 of $(ZrO_2)_{0.9}(Y_2O_3)_{0.1}$ separately illustrated in the figure are each joined in gas-tight fashion to an associated groove 12, and form gas-feed and gas-exhaust ducts for the participating gases, communicating with the porous layers 2 and 4 via apertures made at corresponding locations in the gas-tight coating. Flow takes place in the direction of the arrows 6 to 9, in a similar manner to the flow diagram shown in FIG. 1.

Figure 3:
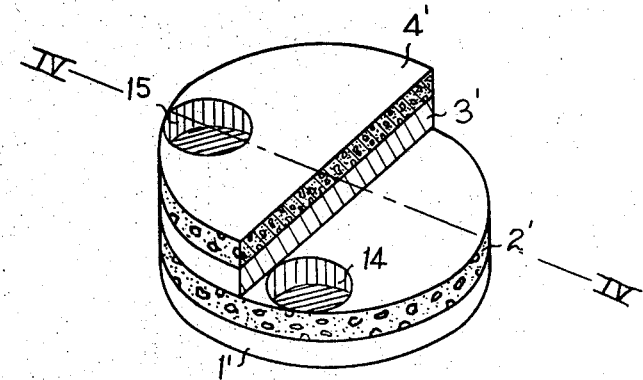
FIG. 3 is a view partly in perspective and partly in section of one cell of another embodiment of the multi-layer fuel cell structure.
Figure 4:
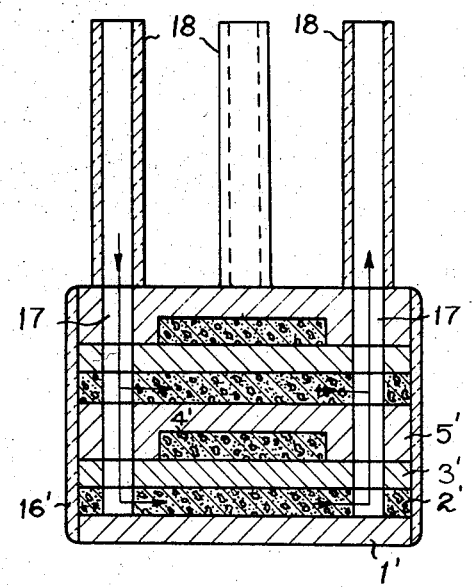
FIG. 4 is a vertical central section of a fuel cell structure on line IV–IV of FIG. 3 comprising a pair of multi-layer, series connected cells each as shown in FIG. 3.

FIGS. 3 and 4 show a further variant of a fuel-cell structure. In order to produce it, the following layers of powder are pressed in cyclically repeating sequence one over another in a cylindrical press-jig:

(a) A layer 1' about 0.5 mm. thick of an electronically conducting mixed oxide, for example $$(ZrO_2)_{0.7}(Mn_2O_3)_{0.3}$$

(b) A layer 2', 0.5 to 1 mm. thick, of a mixture of $(ZrO_2)_{0.9}(Y_2O_3)_{0.1}$ with ammonium carbonate (about the same proportions by volume). Two holes 14 (whereof only one is to be seen in FIG. 3) are made in this layer at two opposite locations at the edge, and are filled with the material of the next layer.

(c) A layer 3' about 0.5 mm. thick of an electrolytically conducting mixed oxide, for example $$(ZrO_2)_{0.9}(Y_2O_3)_{0.1}$$

(d) A layer 4', 0.5 to 1 mm. thick, of a mixture of $(ZrO_2)_{0.9}(Y_2O_3)_{0.1}$ with ammonium carbonate (about the same proportions by volume). Two holes are made at the edge in this layer at two opposite locations 15, offset by 90° with respect to the corresponding locations in the layer 2', and are filled with material 5' of the next layer.

The cylinder thus obtained is slowly heated, so that the ammonium carbonate decomposes and leaves a porous structure in the layers 2' and 4', and thereupon sintered at high temperature. The structure shown in section in FIG. 4 is thus obtained, and is provided with a gas-tight glass coating 16' and bores 17, offset by 90° in each case, at the locations 14 and 15. These bores are continued by the ceramic tubular unions 18, and form feed and exhaust ducts for the participating gases in accordance with the flow diagram in FIG. 1. Finally, the porous spaces are impregnated with a copper-salt solution, and the salt is converted at increased temperature into copper oxide, which separates out on the pore-surfaces. This procedure is repeated a few times. The copper oxide forms an electron-conducting impregnation of the pore-surfaces. During operation, the copper oxide in the fuel-feed layers 4' is reduced to copper, which exhibits a catalytically active action.

For operational purposes, these fuel-cell structures are accommodated in a suitable heating oven which produces the required operational temperature at the start of operation. It is furthermore expedient to provide heat-exchangers in which the incoming gates are preheated in heat-exchange with the hot exhaust gases.

We claim:

1. A high-temperature fuel-cell battery comprising a cylindrical column of fuel cells connected electrically in series, each said cell being constituted by a plurality of superimposed metallic oxide layers consisting in succession of a porous electron-conducting layer through which fuel gas is fed transversely, a gas-tight oxygen-ion conducting layer of cubically stabilized zirconium oxide forming the electrolyte and a porous electron-conducting layer through which a gaseous oxidant is fed transversely, each said cell in the column being separated from an adjacent cell by a gas-tight electron-conducting metallic oxide layer, and gas-tight electron-conducting metallic oxide layers provided respectively at opposite ends of the column, all of said layers being sintered to the layers adjacent thereto thereby to establish a compact multiple fuel cell cylindrical columnar assembly, first and second sets of supply and discharge tubes located along the periphery of said columnar assembly and extending parallel to the axis thereof, said first set of tubes being in communication with only those cell layers through which fuel gas is fed and which serve respectively to supply the fuel gas to and discharge the combustion gas produced from said cell layers, said second set of tubes being in communication with only those cell layers through which the gaseous oxidant is fed and which serve respectively to supply the gaseous oxidant to and discharge the excess oxidant from said cell layers, and a gas-tight glass coating covering the surface of said columnar assembly, said coating being interrupted at said tubes to establish communication between the edges of the respective cell layers and the interior of said tubes.

2. A high-temperature fuel-cell battery as defined in claim 1 wherein the supply and discharge tubes of said first and second sets are located along diametrally opposite edges of said columnar assembly and the tubes of said first set are displaced 90° from the tubes of said second set.

3. A high-temperature fuel-cell battery as defined in claim 1 wherein said tubes fit into arcuate grooves extending along the edges of said columnar assembly.

4. A high-temperature fuel-cell battery comprising a cylindrical column of fuel-cells connected electrically in series, each said cell being constituted by a plurality of superimposed metallic oxide layers consisting in succession of a porous electron-conducting layer through which fuel gas is fed transversely, a gas-tight oxygen-ion conducting layer of cubically stabilized zirconium oxide forming the electrolyte and a porous electron-conducting layer through which a gaseous oxidant is fed transversely, each said cell in the column being separated from an adjacent cell by a gas-tight electron-conducting metallic oxide layer, and gas-tight electron-conducting metallic oxide layers provided respectively at opposite ends of the column, all of said layers being sintered to the layers adjacent thereto thereby to establish a compact multiple fuel-cell cylindrical columnar assembly, said fuel-cells being provided with first and second sets of supply and discharge bores within the marginal region of said columnar assembly and extending parallel to the axis thereof, said first set of bores being separated from those porous cell layers through which the gaseous oxidant is intended to flow by gas-tight electron-conducting zones disposed at the levels of said cell layers and forming continuations of the gas-tight electron-conducting zones adjacent to said cell layers, and said second set of bores being separated from those porous cell layers through which the gaseous fuel is intended to flow by gas-tight electron-conducting zones disposed at the levels of said cell layers and forming continuations of the gas-tight electron-conducting zones adjacent to said cell layers, and the surface of said columnar assembly being covered with a gas-tight glass coating.

5. A high-temperature fuel-cell battery as defined in claim 4 wherein the supply and discharge bores of said first and second sets are located along diametrally opposite edges of said columnar assembly and the bores of said first set are displaced 90° from the bores of said second set.

References Cited

UNITED STATES PATENTS

| 3,402,230 | 9/1968 | White, Jr. | 136—86X |
| 3,300,344 | 1/1967 | Bray et al. | 136—86 |

FOREIGN PATENTS

| 1,403,729 | 5/1965 | France | 136—86 |
| 713,570 | 11/1941 | Germany | 136—86 |

ALLEN B. CURTIS, Primary Examiner